(12) United States Patent
Donehue

(10) Patent No.: US 6,526,907 B1
(45) Date of Patent: Mar. 4, 2003

(54) VIEW AROUND FLOW INDICATOR

(76) Inventor: Wade L. Donehue, P.O. Box 705, League City, TX (US) 77573

(*) Notice: Subject to any disclaimer, the term of this patent is extended or adjusted under 35 U.S.C. 154(b) by 45 days.

(21) Appl. No.: 09/933,520

(22) Filed: Aug. 20, 2001

(51) Int. Cl.[7] .............................. G01D 5/06; G01L 19/08
(52) U.S. Cl. ..................... 116/274; 116/284; 116/112; 116/204; 116/DIG. 7; 137/551
(58) Field of Search .................. 116/276, 273, 116/274, 271, 284, 112, 204, DIG. 7, 267; 137/557, 551, 559

(56) References Cited

U.S. PATENT DOCUMENTS 1,490,901 A * 4/1924 Hendricks .................... 116/267
3,857,277 A * 12/1974 Moore ......................... 116/275
4,101,874 A * 7/1978 Denison ...................... 116/204

* cited by examiner

Primary Examiner—Diego Gutierrez
Assistant Examiner—Travis Reis

(57) ABSTRACT

A flow indicating device including a tube, a turbine wheel, and a cylinder is described. The tube defines a flow path. The turbine wheel is mounted in the tube for rotation alongside an inside wall of the tube. The turbine wheel has a plurality of turbine blades. The cylinder is mounted outside the tube for rotation alongside an outside wall of the tube. The cylinder is magnetically coupled to the turbine wheel through the sidewall of the tube so that rotation of the turbine wheel causes rotation of the cylinder. A visually observable pattern is provided on an outside surface of the cylinder so that rotation of the cylinder can be visually ascertained. The device is easy to install and provides an indication of flow within the pipe which is highly visible, easy to read, and viewable from any location around the pipe.

20 Claims, 2 Drawing Sheets

VIEW AROUND FLOW INDICATOR

BACKGROUND OF THE INVENTION

In one aspect, the invention relates to a device for indicating fluid flow in a pipe.

Determining whether fluid is flowing through a hard-walled opaque pipe can be important for a number of reasons. In the plant setting, a failure to make the correct determination can result in waste and/or destruction on a massive scale, personal injury, and death.

A device to make it easier to correctly make the determination of whether fluid is flowing through a pipe would be very desirable.

It is an object of this invention to provide a flow indicating device which is highly visible, easy to read, and viewable from any location around the pipe.

It is a further object of this invention to make a view around flow indicator which is easily installed in an existing pipe.

SUMMARY OF THE INVENTION

In one embodiment of the invention, there is provided an apparatus comprising a tube, a turbine wheel, and a cylinder. The tube defines a flow path. The turbine wheel is mounted in the tube for rotation alongside an inside wall of the tube. The turbine wheel has a plurality of turbine blades. The cylinder is mounted outside the tube for rotation alongside an outside wall of the tube. The cylinder is magnetically coupled to the turbine wheel through the sidewall of the tube so that rotation of the turbine wheel causes rotation of the cylinder. A visually observable pattern is provided on an outside surface of the cylinder so that rotation of the cylinder can be visually ascertained.

In another embodiment of the invention, there is provided a method for providing a visual indication of flow through an opaque hard walled tube. To carry out the method, a turbine wheel is positioned in the tube for rotation alongside an inside wall of the tube. The turbine wheel has a plurality of turbine blades. A cylinder is positioned on the outside the tube for rotation alongside an outside wall of the tube. The cylinder is magnetically coupled to the turbine wheel through the sidewall of the tube so that rotation of the turbine wheel causes rotation of the cylinder. A visually observable pattern is provided on the outside surface of the cylinder so that rotation of the cylinder can be visually ascertained.

DETAILED DESCRIPTION OF THE INVENTION

Figure 1:
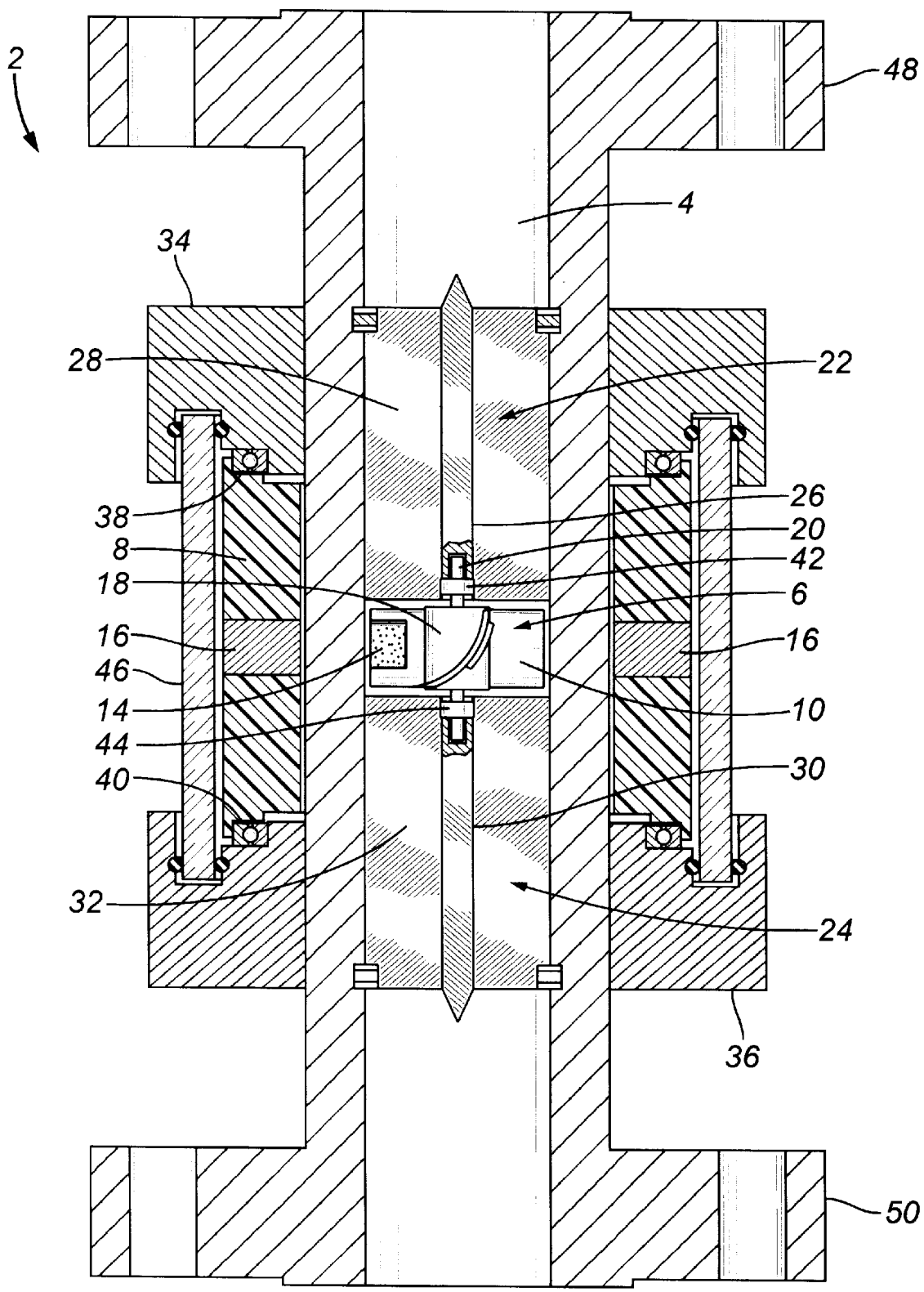
FIG. 1 is a pictorial representation of one embodiment of the invention, taken in partial longitudinal section.
Figure 2:
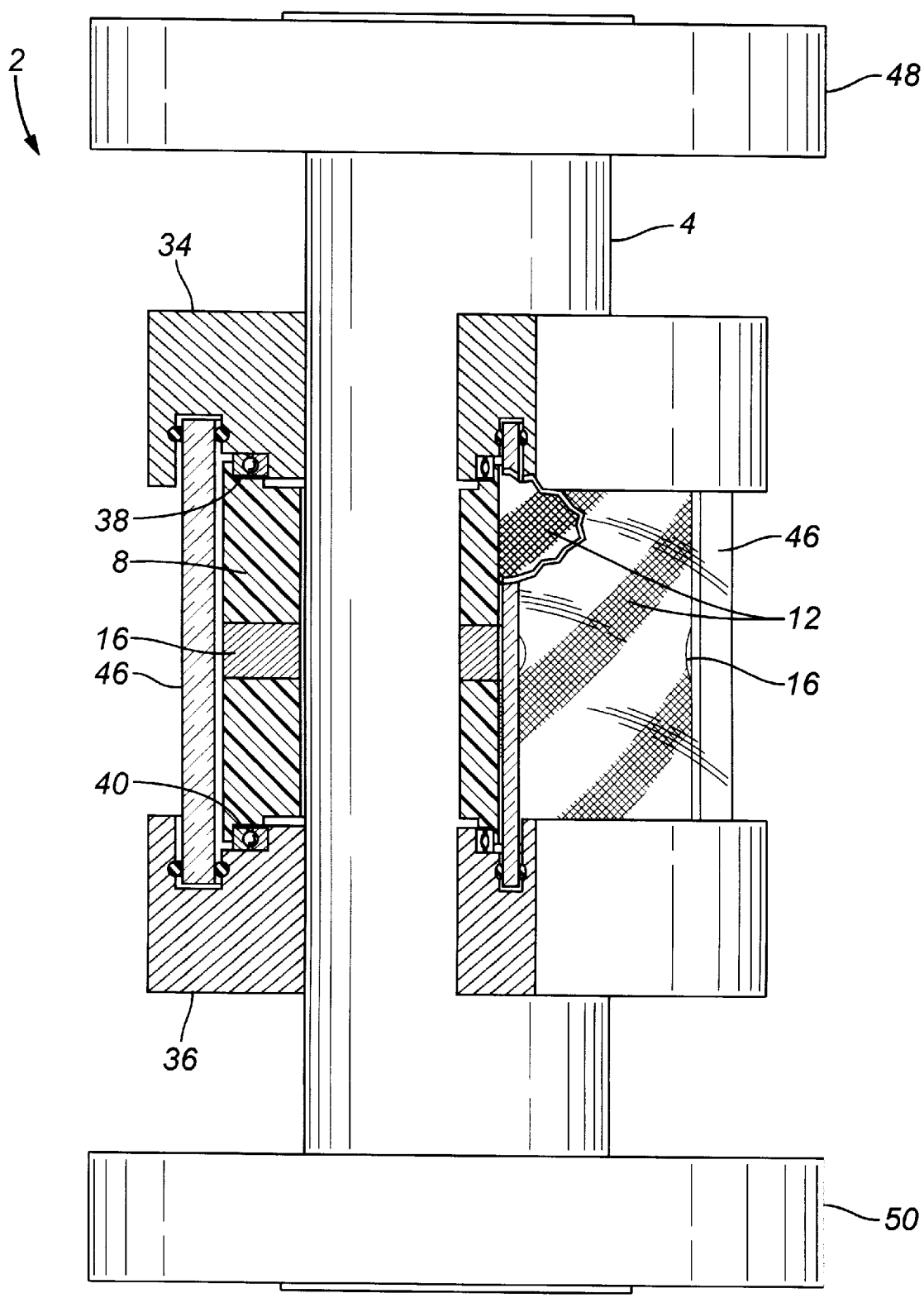
FIG. 2 is a longitudinal sectional view of the embodiment of the invention shown in FIG. 1.

In the illustrated embodiment of the invention, an apparatus 2 for providing a visual indication of fluid flow inside of a tube comprises a tube 4, a turbine wheel 6, and a cylinder 8. The tube defines a flow path. The turbine wheel is mounted in the tube for rotation alongside an inside wall of the tube. Suitable turbine wheels which can be modified as hereinafter described for use according to the invention are known in the art. The turbine wheel has a plurality of turbine blades 10. The cylinder is mounted outside the tube for rotation alongside an outside wall of the tube. The cylinder is magnetically coupled to the turbine wheel through the sidewall of the tube so that rotation of the turbine wheel causes rotation of the cylinder. A visually observable pattern 12 is provided on an outside surface of the cylinder so that rotation of the cylinder can be visually ascertained.

In one embodiment of the invention, the magnetic coupling is provided by a plurality of magnets 14 mounted to the plurality of turbine blades, and a plurality of magnets 16 mounted to the cylinder.

The magnets are mounted to the turbine blades and to the cylinder so as to magnetically couple the blades to the cylinder. Strong magnets are preferred, such as rare earth magnets.

The tube has a longitudinal axis and is preferably constructed of a material which has low magnetic attenuation, such as aluminum. The turbine wheel and the cylinder are preferably mounted coaxially with the longitudinal axis of the tube so that rotation of the cylinder can be visually ascertained for 360 degrees around the tube.

The turbine wheel includes a hub 18 having a longitudinal axis positioned along the longitudinal axis of the tube. The hub has an upper end and a lower end. The plurality of turbine blades extends radially outwardly from the hub.

The turbine wheel further includes an axle 20 positioned along the longitudinal axis of the hub and extending from the upper end and the lower end of the hub. An upper mounting means 22 is mounted to the inside wall of the tube above the turbine wheel and a lower mounting means 24 is mounted to the inside wall of the tube beneath the turbine wheel. In the illustrated embodiment, snap rings are used. The upper mounting means rotatably mounts a portion of the axle extending from the upper end of the hub and the lower mounting means rotatably mounts a portion of the axle extending from the lower end of the hub.

The upper mounting means preferably has an axial portion 26 having a downwardly facing borehole to receive the portion of the axle extending from the upper end of the hub and a plurality of webbing plates 28 extending radially outwardly from the axial portion to locate the axial portion of the upper mounting means along the axis of the tube. The lower mounting means preferably has an axial portion 30 having an upwardly facing borehole to receive the portion of the axle extending from the lower end of the hub and a plurality of webbing plates 32 extending radially outwardly from the axial portion to locate the axial portion of the lower mounting means along the axis of the tube. A portion of the flow path through the tube is defined between the webbing plates.

Each turbine blade has an upper surface generally facing the upper mounting means and a lower surface generally facing the lower mounting means. The turbine wheel is mounted in the tube for fluid impingement against the upper surfaces of the turbine blades, it being assumed that the flow is from top to bottom in the illustrated embodiment, although it is to be understood that the invention can be used at any angle with respect to the vertical. The magnets are mounted to the lower surfaces of the turbine blades. Preferably, these magnets are flat and are oriented with a magnetic pole facing generally radially outwardly. The magnets can be fastened by any suitable means and a number of commercially available adhesives are suitable.

The magnets mounted to the cylinder are positioned with a magnetic pole opposite from the magnetic pole on the turbine blades facing generally radially inwardly and at about the same longitudinal position with respect to the tube as the magnets on the turbine blades, so as to magnetically couple the cylinder to the turbine wheel.

Preferably, the magnets mounted to the cylinder are generally cylindrically shaped and are positioned in passages which extend radially through the sidewall of the cylinder. The number of magnets mounted to the cylinder preferably corresponds to in number and location with the magnets mounted to the turbine blades.

In the illustrated embodiment, the cylinder has an upper end and a lower end. An upper collar 34 is mounted to the outside wall of the tube adjacent the upper end of the cylinder. A lower collar 36 is mounted to the outside wall of the tube adjacent the lower end of the cylinder. An upper outside bearing 38 which rotatably mounts the cylinder to the upper collar is positioned between the upper collar and the upper end of the cylinder. A lower outside bearing 40 which rotatably mounts the cylinder to the lower collar is positioned between the lower collar and the lower end of the cylinder.

Preferably, an upper inside bearing 42 is mounted in downwardly facing borehole of the upper mounting means and receives the portion of the axle extending from the upper end of the hub. A lower inside bearing 44 is mounted in the upwardly facing borehole of the lower mounting means and receives the portion of the axle extending from the lower end of the hub.

To protect the critical elements of the invention from the environment, a transparent cylindrical globe 46 is preferably mounted between the upper collar and the lower collar in covering relationship with the outer surface of the cylinder.

The visually observable pattern on the outside surface of the cylinder can be any that is effective and desired but is preferably a spiral pattern having a direction of pitch which is the same as a direction of pitch as the blades on the turbine wheel. This provides an easy quality determination of direction of flow and rate.

Existing piping can be easily modified to take advantage of the invention, as the invention can be provided as a pipe section which can easily be inserted into an existing line. In the illustrated embodiment, the tube has an upper end and a lower end. A radially outwardly extending upper end flange 48 is positioned at the upper end. A radially outwardly extending lower end flange 50 is positioned at the lower end. Existing piping can be modified by cutting out a section of appropriate length, welding on suitable flanges, and installing an assembly containing the invention.

The method of the invention can be carried out by positioning a turbine wheel in the tube for rotation alongside an inside wall of the tube. The turbine wheel has a plurality of turbine blades. A cylinder is positioned on the outside the tube for rotation alongside an outside wall of the tube. The cylinder is magnetically coupled to the turbine wheel through the sidewall of the tube so that rotation of the turbine wheel causes rotation of the cylinder. A visually observable pattern is provided on the outside surface of the cylinder so that rotation of the cylinder can be visually ascertained. The method is preferably carried out by replacing a section of the tube with an assembly having the turbine wheel and cylinder, which can be as previously described. The visually observable pattern on the outside surface of the cylinder is preferably a spiral pattern which is visually observable for 360 degrees around the tube.

While certain preferred embodiments of the invention have been described herein, the invention is not to be construed as being so limited, except to the extent that such limitations are found in the claims.

What is claimed is:

1. Apparatus comprising a tube defining a flow path, a turbine wheel mounted in the tube for rotation alongside an inside wall of the tube, said turbine wheel having a plurality of turbine blades, a cylinder mounted outside the tube for rotation alongside an outside wall of the tube, said cylinder being magnetically coupled to the turbine wheel through the sidewall of the tube so that rotation of the turbine wheel causes rotation of the cylinder, and a visually observable pattern on an outside surface of the cylinder so that rotation of the cylinder can be visually ascertained.

2. Apparatus as in claim 1 further comprising a plurality of magnets mounted to the plurality of turbine blades, and a plurality of magnets mounted to the cylinder, wherein the magnets are mounted to the turbine blades and to the cylinder so as to magnetically couple the blades to the cylinder.

3. Apparatus as in claim 2 wherein the tube has a longitudinal axis, and the turbine wheel and the cylinder are mounted coaxially with the longitudinal axis of the tube, so that rotation of the cylinder can be visually ascertained for 360 degrees around the tube.

4. Apparatus as in claim 3 wherein the turbine wheel includes a hub having a longitudinal axis positioned along the longitudinal axis of the tube, said hub having an upper end and a lower end, and the plurality of turbine blades extends radially outwardly from the hub.

5. Apparatus as in claim 4 wherein the turbine wheel further includes an axle positioned along the longitudinal axis of the hub and extending from the upper end and the lower end of the hub.

6. Apparatus as in claim 5 further comprising an upper mounting means mounted to the inside wall of the tube above the turbine wheel and a lower mounting means mounted to the inside wall of the tube beneath the turbine wheel, said upper mounting means rotatably mounting a portion of the axle extending from the upper end of the hub and said lower mounting means rotatably mounting a portion of the axle extending from the lower end of the hub.

7. Apparatus as in claim 6 wherein the upper mounting means has an axial portion having a downwardly facing borehole to receive the portion of the axle extending from the upper end of the hub and a plurality of webbing plates extending radially outwardly from the axial portion to locate the axial portion of the upper mounting means along the axis of the tube, and the lower mounting means has an axial portion having an upwardly facing borehole to receive the portion of the axle extending from the lower end of the hub and a plurality of webbing plates extending radially outwardly from the axial portion to locate the axial portion of the lower mounting means along the axis of the tube, wherein a portion of the flow path through the tube is defined between the webbing plates.

8. Apparatus as in claim 7 wherein each turbine blade has an upper surface generally facing the upper mounting means and a lower surface generally facing the lower mounting means, wherein the turbine wheel is mounted in the tube for fluid impingement against the upper surfaces of the turbine blades, and the magnets are mounted to the lower surfaces of the turbine blades.

9. Apparatus as in claim 8 wherein the magnets mounted to the lower surfaces of the turbine blades are flat and are oriented with a magnetic pole facing generally radially outwardly.

10. Apparatus as in claim 9 wherein the magnets mounted to the cylinder are positioned with a magnetic pole opposite from the magnetic pole on the turbine blades facing generally radially inwardly and at about the same longitudinal position with respect to the tube as the magnets on the turbine blades, so as to magnetically couple the cylinder to the turbine wheel.

11. Apparatus as in claim 10 wherein the magnets mounted to the cylinder are generally cylindrically shaped and are positioned in passages which extend radially through the sidewall of the cylinder.

12. Apparatus as in claim 11 wherein the number of magnets mounted to the cylinder correspond to in number and location with the magnets mounted to the turbine blades and the magnets comprise rare earth magnets.

13. Apparatus as in claim 12 wherein the cylinder has an upper end and a lower end, said apparatus further comprising an upper collar mounted to the outside wall of the tube adjacent the upper end of the cylinder, a lower collar mounted to the outside wall of the tube adjacent the lower end of the cylinder, and upper outside bearing rotatably mounting the cylinder to the upper collar positioned between the upper collar and the upper end of the cylinder, and a lower outside bearing rotatably mounting the cylinder to the lower collar positioned between the lower collar and the lower end of the cylinder.

14. Apparatus as in claim 13 further comprising an upper inside bearing mounted in downwardly facing borehole of the upper mounting means which receives the portion of the axle extending from the upper end of the hub, and a lower inside bearing mounted in the upwardly facing borehole of the lower mounting means which receives the portion of the axle extending from the lower end of the hub.

15. Apparatus as in claim 14 further comprising a transparent cylindrical globe mounted between the upper collar and the lower collar in covering relationship with the outer surface of the cylinder.

16. Apparatus as in claim 15 wherein the visually observable pattern on the outside surface of the cylinder is a spiral pattern having a direction of pitch which is the same as a direction of pitch as the blades on the turbine wheel.

17. Apparatus as in claim 16 wherein the tube has an upper end and a lower end and a radially outwardly extending upper end flange is positioned at the upper end and a radially outwardly extending lower end flange is positioned at the lower end.

18. A method for providing a visual indication of flow through an opaque hard walled tube comprising positioning a turbine wheel in the tube for rotation alongside an inside wall of the tube, said turbine wheel having a plurality of turbine blades, positioning a cylinder on the outside the tube for rotation alongside an outside wall of the tube, said cylinder being magnetically coupled to the turbine wheel through the sidewall of the tube so that rotation of the turbine wheel causes rotation of the cylinder, and providing a visually observable pattern on the outside surface of the cylinder so that rotation of the cylinder can be visually ascertained.

19. A method as in claim 18 wherein the turbine wheel and the cylinder are positioned in operable arrangement with the tube by replacing a section of the tube with an assembly having the turbine wheel and the cylinder.

20. A method as in claim 19 wherein the visually observable pattern on the outside surface of the cylinder is a spiral pattern which is visually observable for 360 degrees around the tube.

* * * * *